(12) United States Patent
Heidari-Bateni et al.

(10) Patent No.: US 7,764,690 B2
(45) Date of Patent: Jul. 27, 2010

(54) MULTILAYER BRIDGING SYSTEM AND METHOD

(75) Inventors: Ghobad Heidari-Bateni, San Diego, CA (US); Alaaa Hilal Muqattash, San Diego, CA (US)

(73) Assignee: Olympus Corporation, Hachioji-Shi, Tokyo (JP)

( * ) Notice: Subject to any disclaimer, the term of this patent is extended or adjusted under 35 U.S.C. 154(b) by 464 days.

(21) Appl. No.: 11/558,263

(22) Filed: Nov. 9, 2006

(65) Prior Publication Data

US 2007/0121656 A1 May 31, 2007

Related U.S. Application Data

(60) Provisional application No. 60/740,060, filed on Nov. 28, 2005.

(51) Int. Cl.
*H04L 12/28* (2006.01)
(52) U.S. Cl. .................. 370/392; 370/401; 370/469
(58) Field of Classification Search ................ 370/392, 370/401, 469
See application file for complete search history.

(56) References Cited

U.S. PATENT DOCUMENTS

| 6,678,252 | B1 | 1/2004 | Cansever |
| 6,907,469 | B1 | 6/2005 | Gallo et al. |
| 6,873,603 | B1 | 3/2007 | Ivanturi |
| 2002/0093968 | A1* | 7/2002 | Perlman et al. ............ 370/401 |
| 2002/0116527 | A1* | 8/2002 | Chen et al. ................. 709/245 |
| 2007/0038743 | A1 | 2/2007 | Hellhake |
| 2007/0104215 | A1* | 5/2007 | Wang et al. ................. 370/458 |

OTHER PUBLICATIONS

Jing Zhu et al., Leveraging spatial reuse in 802.11 mesh networks with enhanced physical carrier sensing, Communications, 2004 IEEE International Conference on, Jun. 2004, pp. 4004-4011, vol. 7, 20-24.
Acharya, A. et al., Design and analysis of cooperative medium access scheme for wireless mesh networks, Broadband Networks, 2004, BoardNets 2004. Proceedings. First International Conference on 2004, pp. 621-631.
Xingang Gho, et al., Spatial reuse in wireless ad-hoc networks, Vehicular Technology Conference, 2003. VTC 2003- Fall. 2003 IEEE 58th, pp. 1437-1442, vol. 3, 6-9.
Salwen, H., et al., Examination of the applicability of router and bridging techniques, IEEE Network, Jan. 1988, pp. 77-80, vol. 2, Issue 1.

* cited by examiner

*Primary Examiner*—Jayanti K Patel
*Assistant Examiner*—Jung Park
(74) *Attorney, Agent, or Firm*—Sheppard Mullin Richter & Hampton LLP

(57) ABSTRACT

A multilayer bridge supports a plurality of bridge protocols for various electronic devices. In one embodiment, the multilayer bridge is implemented as a wireless multilayer bridge, configured to provide the choice of bridge functionality to network devices. The multilayer bridge can be configured to include a plurality of bridge engines, a controller communicatively coupled to the first and second bridge engines, and a data storage device communicatively coupled to the controller and configured to store a bridge selection preference for a network device. The controller can be configured to receive a communication from a device, retrieve a bridge engine choice for the device in the data store, and invoke the bridge engine identified for the device.

33 Claims, 7 Drawing Sheets

| ADDRESS — 224 | BRIDGE CHOICE — 226 | EXPIRATION — 228 |
|---|---|---|
| ADDRESS | BRIDGE CHOICE | EXPIRATION |
| ADDRESS | BRIDGE CHOICE | EXPIRATION |
| ADDRESS | BRIDGE CHOICE | EXPIRATION |
| ADDRESS | BRIDGE CHOICE | EXPIRATION |
| ⋮ | ⋮ | ⋮ |
| ADDRESS | BRIDGE CHOICE | EXPIRATION |
| ADDRESS | BRIDGE CHOICE | EXPIRATION |

MULTILAYER BRIDGING SYSTEM AND METHOD

CROSS-REFERENCE TO RELATED APPLICATIONS

This application claims priority from U.S. Provisional application Ser. No. 60/740,060, filed on Nov. 28, 2005, which is incorporated herein by reference in its entirety.

TECHNICAL FIELD

The present invention relates to the field of communications, and more particularly, some embodiments relate to bridges for communications relay.

DESCRIPTION OF THE RELATED ART

With the many continued advancements in communications technology, more and more devices are being introduced in both the consumer and commercial sectors with advanced communications capabilities. Additionally, advances in processing power and low-power consumption technologies, as well as advances in data coding techniques have led to the proliferation of wired and wireless communications capabilities on a widespread basis in a variety of different platforms.

For example, communication networks, both wired and wireless, are now commonplace in many homes offices and other environments. Such networks allow various heretofore independent devices to share data and other information to enhance productivity or simply to improve their convenience to the user. One such communication network that is gaining widespread popularity is an exemplary implementation of a wireless network such as that specified by the WiMedia-MBOA (Multiband OFDM Alliance). Other exemplary networks include the Bluetooth® communications network and various IEEE standards-based networks such as 802.11 and 802.16 communications networks, to name a few.

Such networks have proliferated airports, coffee shops, hotels, offices and other public places. Additionally, wireless networking has become commonplace in the home environment to provide convenience to the user in easily connecting multiple devices. Architects of these and other networks, and indeed communications channels in general, have long struggled with the challenge of managing multiple communications across a limited channel. For example, in some environments, more than one device may share a common carrier channel and thus run the risk of encountering a communication conflict between the one or more devices on the channel. Over the years, network architects have come up with various solutions to arbitrate disputes or otherwise delegate bandwidth among the various communicating devices, or clients, on the network. Schemes used in well known network configurations such as token rings, Ethernet, and other configurations have been developed to allow sharing of the available bandwidth. In addition to these schemes, other techniques have been employed, including for example CDMA (code division multiple access) and TDMA (time division multiple access) for cellular networks.

FDM (Frequency Division Multiplexing) is another technology that enables multiple devices to transmit their signals simultaneously over a communication channel in a wired or wireless setting. The devices' respective signals travel within their designated frequency band (carrier), onto which the data (text, voice, video, or other data.) is modulated. With adequate separation in frequency band spacing, multiple devices can simultaneously communicate across the same communication channel (network or point-to-point).

Orthogonal FDM (OFDM) spread spectrum systems distribute the data over a plurality of carriers that are spaced apart at precise frequencies. The spacing is chosen so as to provide orthogonality among the carriers. Thus, a receiver's demodulator recovers the modulated data with little interference from the other carrier signals. The benefits of OFDM are high spectral efficiency, resiliency to RF interference, and lower multi-path distortion or inter symbol interference (ISI). OFDM systems can be combined with other techniques (such as time-division multiplexing) to allow sharing of the individual carriers by multiple devices as well, thus adding another dimension of multiplexing capability.

In many instances, devices can be configured to communicate with other networks. To facilitate such communications, a bridge can be used to provide connectivity. A network bridge typically can be used to connect multiple networks or multiple segments. Bridges can be used to provide connectivity at the physical layer as well as at the data link layer. In Ethernet networks, for example, a bridge is a device that behaves according to the IEEE 802.1D standard, although other bridging techniques are possible.

One type of bridging, transparent bridging, uses a database to send frames across network segments. If an address entry is not found in the forwarding database, the frame is rebroadcast to all ports of the bridge, forwarding the frame to all segments except the source address. Normally, the network adapter only processes specific frames received. With transparent bridging, the network bridge places the network adapters of the bridge in a mode referred to as promiscuous mode. In promiscuous mode, the network adapter processes all frames received. Layer 2 bridging is an implementation of IEEE 802.1D transparent bridging that has been used in conventional bridges and Layer 2 switches for many years. Layer 3 bridging is used if the network adapter does not support promiscuous mode. Layer 3 bridging does not require special network adapter functionality, and works for TCP/IP traffic.

Single layer bridging can have associated with it certain limitations. More particularly, a layer-2 bridge might typically: require additional header bytes (14 extra bytes) in each transmitted packet; require the device to identify bridges in its neighborhood, require the device to dynamically decide which bridge forwards the device traffic (which may imply additional complexity in the design of the device); require the device to monitor its selected bridge and determine the quality of that selection and whether or not there is another bridge in the neighborhood with a better link quality, restrict the creation with which VLANs can be established to be based on only MAC addresses or port numbers (IP-based VLAN is a much more flexible solution in many cases); or not scale well because of broadcasts.

BRIEF SUMMARY OF EMBODIMENTS OF THE INVENTION

According to one embodiment of the invention, a method for bridging segments of a wireless network is provided. The method can be implemented for example, with the steps of receiving at a multilayer bridge a data packet from a network device, determining at the multilayer bridge which of a plurality of bridge engines to use for the network device, and the multilayer bridge invoking the determined bridge engine to process the data packet. The method can further comprises steps of routing the data packet to a network element using the invoked bridge choice; receiving a communication from a network device identifying a bridge choice for that network device; and storing the identified bridge choice in a data storage device. In another embodiment, the method can comprise the step of receiving at the multilayer bridge a bridge choice identification from the network device in a data packet.

In one embodiment, the step of determining comprises the step of looking up a predetermined bridge choice for the network device in a data storage device. In a further embodiment, the plurality of bridge choices comprise a layer 2 bridge engine and a layer 3 bridge engine. In yet a further embodiment, the step of invoking the determined bridge engine comprises the step of forwarding the data packet to the determined bridge engine for processing; or of executing bridge engine instructions to process the data packet. In still another embodiment, the step of processing the data packet comprises forwarding the packet to all ports or forwarding the data packet to a corresponding port.

According to another embodiment of the invention, a wireless multilayer bridge, is provided that can include a first bridge engine and a second bridge engine; a controller communicatively coupled to the first and second bridge engines; and a data storage device communicatively coupled to the controller and configured to store a bridge selection preference for a network device. The controller can be configured to receive a communication from a device, retrieve a bridge engine choice for the device in the data store, and invoke the bridge engine identified for the device. The wireless multilayer bridge can be implemented to include a wireless communications interface configured to interface the wireless multilayer bridge to other network devices. In one embodiment, the data store comprises a bridge choice table. In another embodiment, the first bridge engine comprises a layer 2 bridge engine and the second bridge engine comprises a layer 3 bridge engine. The wireless multilayer bridge can be implemented to receive a bridge choice identification from a network device in a data packet.

According to yet another embodiment of the invention, a computer program product is provided that includes a computer useable medium having computer program logic embodied therein for enabling a controller in a multilayer bridge to process data packets. In one embodiment, the computer program logic includes: first computer readable program code for enabling the controller to receive a data packet from a network device; second computer readable program code for enabling the controller to determine at the multilayer bridge which of a plurality of bridge engines to use for the network device; and third computer readable program code for enabling the controller to invoke the determined bridge engine to process the data packet. In another embodiment, the computer program product can further include computer readable program code for enabling the controller to route the data packet to a network element using the invoked bridge choice. In a further embodiment, the second computer readable program code comprises computer readable program code for enabling the controller to look up a predetermined bridge choice for the network device in a data storage device. In still a further embodiment, the data storage device comprises a bridge choice lookup table. In yet another embodiment, computer program product further comprises computer readable program code for enabling the controller to receive a communication from a network device identifying a bridge choice for that network device, and to store the identified bridge choice in a data storage device. In yet another embodiment, computer program product further comprises computer readable program code for enabling the controller to receive a bridge choice identification from a network device in a data packet.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

FIG. 4 is a diagram illustrating an example data structure for a bridge choice table 210 in accordance with one embodiment of the invention.

Figure 1:
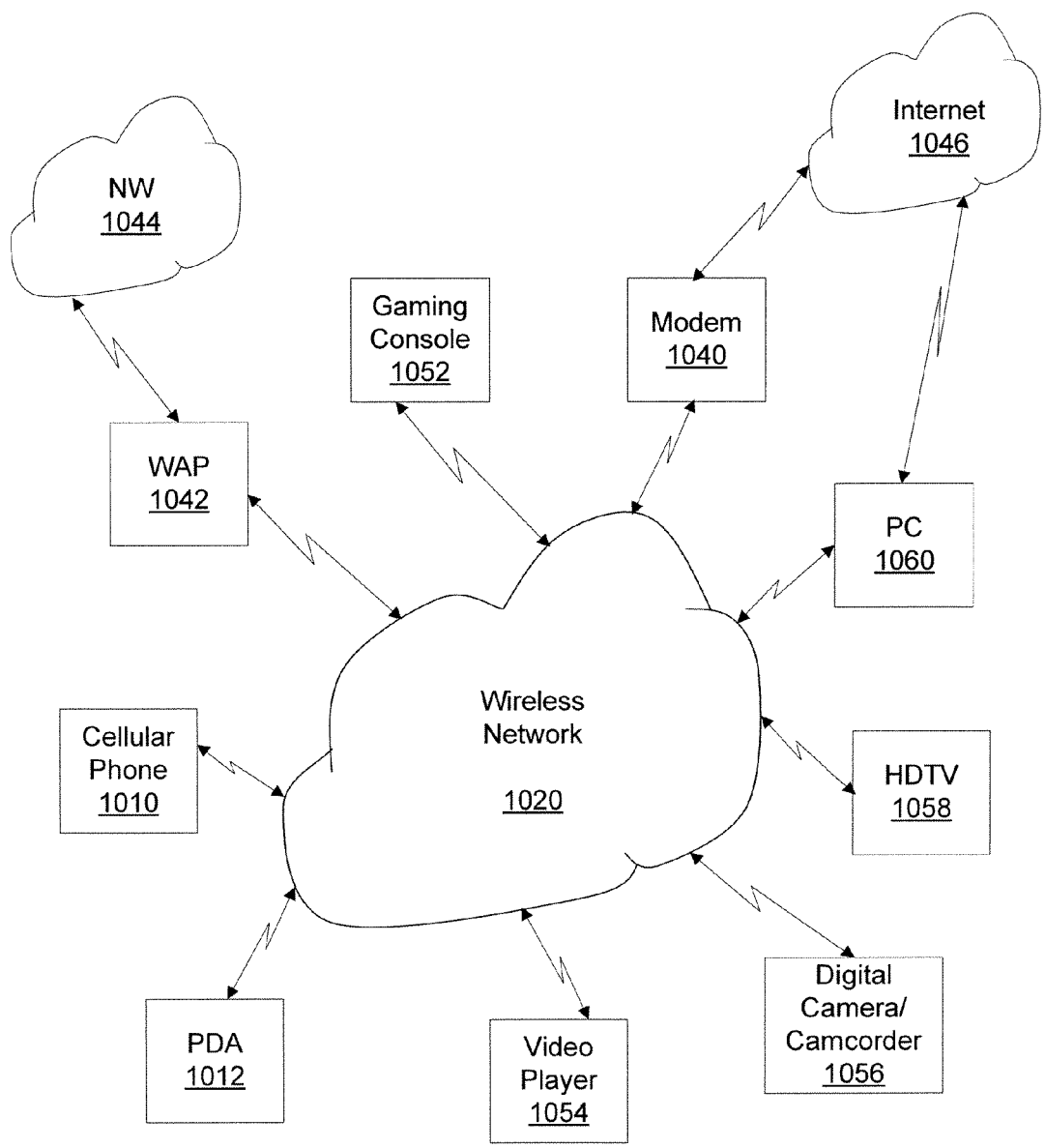
FIG. 1 is a block diagram illustrating one possible configuration of a wireless network that can serve as an example environment in which the present invention can be implemented.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention is directed toward a system and method for providing a bridging solution. In one embodiment the bridging solution can be implemented to provide bridging between wired and wireless networks. In another embodiment, the solution can be implemented to provide bridging within a completely distributed wireless network. In a further embodiment, the solution can be implemented to provide multilayer bridging. In yet another embodiment, the present invention can be implemented to allow co-existence of different devices in the same network.

Because there are often tradeoffs between solutions, providing multilayer solutions can, in one embodiment, allow designers to get the best of both solutions. One may prefer an layer 3 solution simply because it might require less complexity in the device. For example, complexity could be an issue for low processing power, cheap, battery-operated devices. On the other hand, one may prefer a layer 2 solution to keep the forwarding choices in the device and to support protocols other than IP. Because, different performance criteria might result in different choices, multilayer solutions can provide benefit. Additionally, in one embodiment the implementation of a multilayer bridging protocol can be performed so as to allow different vendors to design their devices however they want (Layer 2, Layer 3 or otherwise) according to their preferred performance measures, and to even be able to switch their devices' operation between the two mode.

Before describing the invention in detail, it is useful to describe an example environment in which the invention can be implemented. One such example is a wireless network in which multiple electronic devices (for example, computers and computing devices, cellular telephones, personal digital assistants, motion and still cameras, among others) can communicate and share data, content and other information with one another. One example of such a network is that specified by the WiMedia standard (within WiMedia and Multi-Band OFDM Alliance). From time-to-time, the present invention is described herein in terms of a distributed network or in terms of a WiMedia standard. Description in terms of these environments is provided to allow the various features and embodiments of the invention to be portrayed in the context of an exemplary application. After reading this description, it will become apparent to one of ordinary skill in the art how the invention can be implemented in different and alternative environments. Indeed, applicability of the invention is not limited to a distributed wireless network, nor is it limited to a WiMedia standard described as one implementation of the example environment.

Most network standards specify policies or rules that govern the behavior of network connected devices. The WiMedia standard specifies the mechanism and policies that are to be followed by W-USB and WiNet compliant devices in order to allow for an ad hoc and distributed network of such devices to operate efficiently.

FIG. 1 is a block diagram illustrating one possible configuration of a wireless network that can serve as an example environment in which the present invention can be implemented. Referring now to FIG. 1, a wireless network 1020 is provided to allow a plurality of electronic devices to communicate with one another without the need for wires or cables between the devices. A wireless network 1020 can vary in coverage area depending on a number of factors or parameters including, for example, the transmit power levels and receive sensitivities of the various electronic devices associated with the network. Examples of wireless networks can include the various IEEE and other standards as described above, as well as other wireless network implementations.

With many applications, the wireless network 1020 operates in a relatively confined area, such as, for example, a home or an office. The example illustrated in FIG. 1 is an example of an implementation such as that which may be found in a home or small office environment. Of course wireless communication networks and communication networks in general are found in many environments outside the home and office as well. In the example illustrated in FIG. 1, wireless network 1020 includes a communication device to allow it to communicate with external networks. More particularly, in the illustrated example, wireless network 1020 includes a modem 1040 to provide connectivity to an external network such as the Internet 1046, and a wireless access point 1042 that can provide external connectivity to another network 1044.

Also illustrated in the example wireless network 1020 are portable electronic devices such as a cellular telephone 1010 and a personal digital assistant (PDA) 1012. Like the other electronic devices illustrated in FIG. 1, cellular telephone 1010 and PDA 1012 can communicate with wireless network 1020 via the appropriate wireless interface. Additionally, these devices may be configured to further communicate with an external network. For example, cellular telephone 1010 is typically configured to communicate with a wide area wireless network by way of a base station.

Additionally, the example environment illustrated in FIG. 1 also includes examples of home entertainment devices connected to wireless network 1020. In the illustrated example, electronic devices such as a gaming console 1052, a video player 1054, a digital camera/camcorder 1056, and a high definition television 1058 are illustrated as being interconnected via wireless network 1020. For example, a digital camera or camcorder 1056 can be utilized by a user to capture one or more still picture or motion video images. The captured images can be stored in a local memory or storage device associated with digital camera or camcorder 1056 and ultimately communicated to another electronic device via wireless network 1020. For example, the user may wish to provide a digital video stream to a high definition television set 1058 associated with wireless network 1020. As another example, the user may wish to upload one or more images from digital camera 1056 to his or her personal computer 1060 or to the Internet 1046. This can be accomplished by wireless network 1020. Of course, wireless network 1020 can be utilized to provide data, content, and other information sharing on a peer-to-peer or other basis, as the provided examples serve to illustrate.

Also illustrated is a personal computer 1060 or other computing device connected to wireless network 1020 via a wireless air interface. As depicted in the illustrated example, personal computer 1060 can also provide connectivity to an external network such as the Internet 1046.

In the illustrated example, wireless network 1020 is implemented so as to provide wireless connectivity to the various electronic devices associated therewith. Wireless network 1020 allows these devices to share data, content, and other information with one another across wireless network 1020. Typically, in such an environment, the electronic devices would have the appropriate transmitter, receiver, or transceiver to allow communication via the air interface with other devices associated with wireless network 1020. These electronic devices may conform to one or more appropriate wireless standards and, in fact, multiple standards may be in play within a given neighborhood. Electronic devices associated with the network typically also have control logic configured to manage communications across the network and to manage the operational functionality of the electronic device. Such control logic can be implemented using hardware, software, or a combination thereof. For example, one or more processors, ASICs, PLAs, and other logic devices or components can be included with the device to implement the desired features and functionality. Additionally, memory or other data and information storage capacity can be included to facilitate operation of the device and communication across the network.

Electronic devices operating as a part of wireless network 1020 are sometimes referred to herein as network devices, members or member devices of the network or devices associated with the network. In one embodiment devices that communicate with a given network may be members or merely in communication with the network.

Some communication networks are divided into periods or frames that can be used for communication and other activities. For example, as discussed above, some networks have a scheduling window such as, for example, a beacon period, for scheduling upcoming communication activities. Also, some networks have a communication window during which such communication activities take place. In the WiMedia-MBOA standard, the bandwidth is divided into superframes, which in turn are divided into time slots for the transmission and reception of data by the various electronic devices associated with the network.

Figure 2:
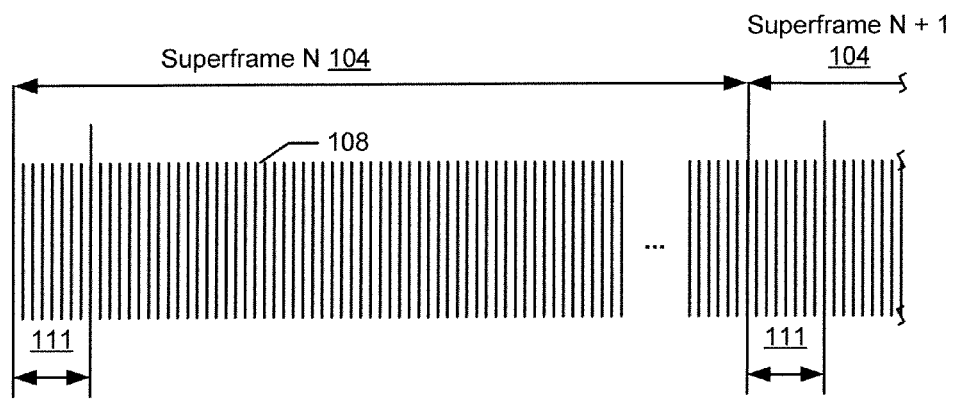
FIG. 2 is an example time slots in the example environment in which the present invention can be implemented.

An example of such time slots are illustrated in FIG. 2. Referring now to FIG. 2, in this exemplary environment, the communication bandwidth is divided into superframes 104 (two illustrated), each superframe 104 itself being divided into a plurality of timeslots referred to as Media Access Slots 108. In the example environment, there are 256 media access slots 108 in each superframe 104, although other allocations are possible. Additionally, at the beginning of each superframe 104 is a beacon period 111, which is comprised of a plurality of beaconing slots. In some networks, the beacon period 111 is a period during which devices reserve timeslots and exchange other housekeeping or status information. For example, in the WiMedia-MBOA distributed wireless network, the superframes comprise a beacon period 111, during which devices are awake and receive beacons from other devices. Superframes in the above-referenced standard, and other time periods used for communications among devices in other network configurations, with or without scheduling windows, are generally referred to herein as communication windows.

Having thus described an example environment in which the invention can be implemented, various features and embodiments of the invention are now described in further detail. Description may be provided in terms of this example environment for ease of discussion and understanding only. After reading the description herein, it will become apparent to one of ordinary skill in the art that the present invention can be implemented in any of a number of different communication environments (including wired or wireless communication environments, and distributed or non-distributed networks) operating with any of a number of different electronic devices and according to various similar or alternative protocols or specifications.

Figure 3:
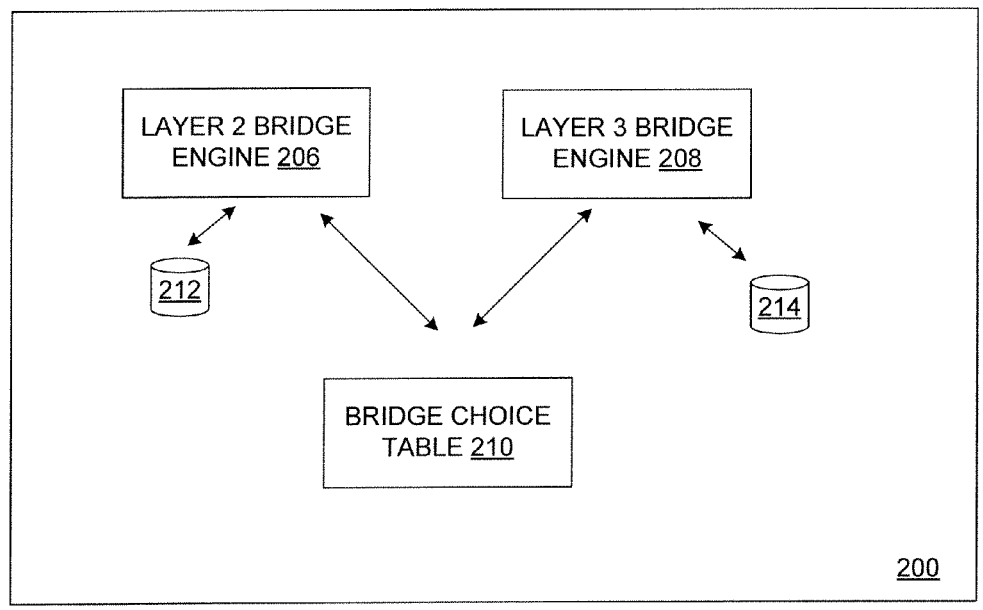
FIG. 3 is a block diagram illustrating an example architecture for a multilayer bridge in accordance with one embodiment of the invention.

FIG. 3 is a block diagram illustrating an example architecture for a multilayer bridge in accordance with one embodiment of the invention. Referring now to FIG. 3, the example architecture includes two bridge layer engines. In the depicted example, the layer engines are implemented as a layer 2 engine 206 and a layer 3 engine 208. As would be apparent to one of ordinary skill in the art after reading this description, alternative layer engines can be provided to perform desired bridge functions depending on the application, or on the features or functionality desired. Additionally, additional engines can be provided to offer greater flexibility in selecting bridge functionality. The illustrated example also includes data storage devices 212, 214 that can be used by the bridge engines in performing the bridging functions. An example of the use of data storage (for example, tables) to facilitate bridge functionality is described below with reference FIGS. 6 and 7 wherein example layer 2 and layer 3 bridge operations are described.

In one embodiment, a selection engine is configured to receive an incoming communication from a network device and to determine which layer engine to use in handling the network device's communication. Also provided in the illustrated example is a data storage device 210, which, in the example embodiment, is used to store information that can be used to facilitate selecting a bridge engine to perform the bridging functions. Any of a number of data storage mechanisms can be utilized, including various electrical, magnetic and optical storage mechanisms. In one embodiment, data storage 210 can be implemented as a table that is used to store device preferences for bridging applications. For clarity of discussion, this storage is referred to herein as a bridge choice table 210. In accordance with this example architecture, when a communication is received from a network device, the selection engine determines the device's layer preference. In one embodiment, a device can advertise or announce its bridging preference in their beacon (for example, in the WiNet Identification IE). The preference is received by the bridge and the bridge records the preference in the data storage for future reference when communications are received by the device.

In another embodiment, the device indicates its bridging preference in the data packet to be forwarded. This can be implemented such that the bridge is not required to keep a table. However, in one embodiment additional overhead in the data packet (for example, in the WiNet header) is used to announce the choice. For example, with two bridging choices, one bit can be used in every data packet to announce a selection from among the two.

With the bridging choice determined, the multilayer bridge 200 invokes the appropriate layer engine. In one embodiment, this can be accomplished by forwarding the communication to the appropriate layer engine for processing. In another embodiment, this can be accomplished by calling the appropriate routines for the designated layer engine and processing the communication.

In one embodiment, multilayer bridge 200 also includes a communications interface (not illustrated) to receive communications from network devices and to forward or route communications as appropriate. Examples of handling communications for network devices are described below with reference to FIGS. 4-7. The communications interface can be hardwired or wireless and multiple ports (wired or wireless) can be provided. In the preferred embodiment, multilayer bridge 200 is a wireless multilayer bridge configured to interface wireless devices in a wireless network.

As discussed further below, an engine can comprise hardware, software or a combination thereof. In one embodiment, a processor, controller, ASIC, FPGA, or other processing device, generally referred to as a controller, can be provided to perform the functions associated with an engine. For example, a single controller can be provided to execute the functions of the various engines, or multiple controllers can be provided.

FIG. 4 is a diagram illustrating an example data structure for a bridge choice table 210 in accordance with one embodiment of the invention. The example illustrated in FIG. 4 includes entries for various devices such that their bridge choices can be logged for bridging operations. Therefore, in this example embodiment, the bridge choice table includes table entries to identify the devices. In the illustrated example, devices are identified by their respective addresses, which are stored in an address field 224. For each device, an entry for the device's bridge choice 226 is provided wherein the preferred bridge choice for that device can be included. Also illustrated in the example of FIG. 4 is a field for an expiration date 228 on which the bridge choice is set to expire. Although not illustrated in FIG. 4, alternative configurations and implementations can be provided to accomplish the functionality of identifying or storing bridge choices for one of more devices that may utilize the multilayer bridge 200.

As would be apparent to one of ordinary skill in the art after reading this description, additional information can be included with the bridge choice table 210 to enhance the features afforded by the invention. For example, in another embodiment, primary and secondary bridge choices can be specified such that in the event of unavailability of the primary choice, multilayer bridge 200 can default to a secondary bridging choice for a given device. Additionally, in another embodiment, bridging choices can be made based on factors such as, for example, packet types, destination addresses or other factors that might be used to identify an alternative bridge selection. As such, in such embodiments, the bridge choice table 210 can be implemented to include multiple bridge choices as well as a condition or conditions to be checked to determine which of the multiple bridge choices to select. For example, a multimedia device may be implemented so as to route audio and video data via one type of bridge engine and to route data files via another type of bridge engine.

Figure 5:
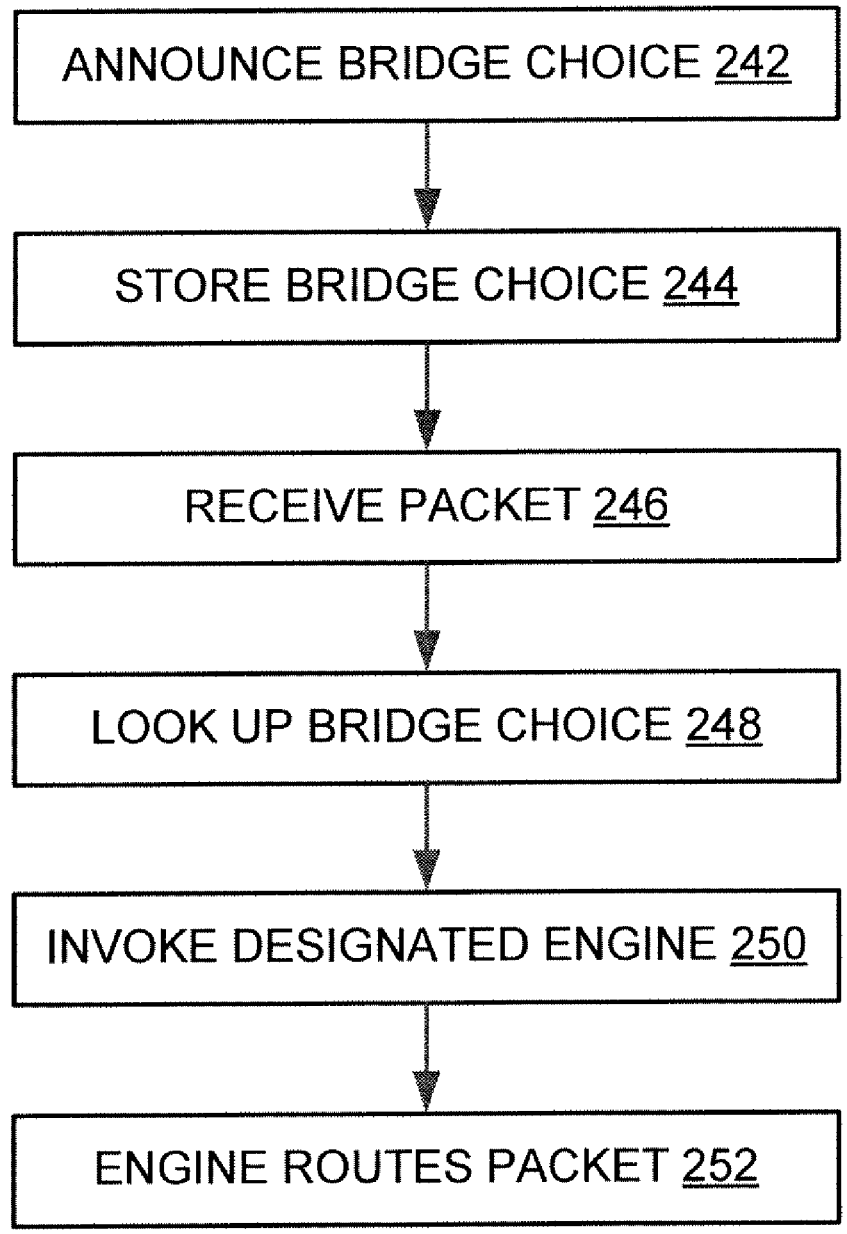
FIG. 5 is a flow diagram illustrating an example operation of a multilayer bridge in accordance with one embodiment of the invention.

Having thus described an example architecture for a multilayer bridge 200 and a data storage mechanism 210, an example operation of a multilayer bridge is now described. For ease of discussion, this example operation is described in terms of the example architectures described above with reference to FIGS. 3 and 4. It will become apparent to one of ordinary skill in the art after reading this description how the invention can operate with other architectures in other embodiments. FIG. 5 is a flow diagram illustrating an example operation of a multilayer bridge in accordance with one embodiment of the invention. Referring now to FIG. 5, in a step 242 a network device associated with the network announces its bridging choice to the multilayer bridge 200. In one embodiment, the announcement can be made, for example, in the WiNET Identification IE, or in the beacon. In other embodiments, other communications can occur between network devices and the multilayer bridge to enable the devices to register their bridge choices or to provide other relevant information to the multilayer bridge 200.

In a step 244, the multilayer bridge stores the bridging choice in memory 210. For example, in terms of the above-depicted architecture, the multilayer bridge 200 stores the device address 224 and the bridge choice 226 in a bridge choice table 210. Additionally, in one embodiment, where an expiration date or time may be provided, this information can also be stored. Also, as discussed above, in various embodiments additional information can be included and stored in table 210.

In conducting network operations, a network device may send data destined for another device. In terms of the example environment, the data is packaged into packets for routing to a destination device across the network. In instances where a bridge is used (for example, to connect LAN segments), the packet is routed via the bridge. In this and other scenarios, in a step 246, the multilayer bridge 200 receives the data packet for routing. In a step 248, the multilayer bridge 200 looks up the sending devices bridge choice. In one embodiment, in accordance with the example illustrated in FIG. 4, multilayer bridge 200 checks the address of the sending device, and looks up the device's bridge choice stored in bridge choice table 210.

In a step 250, the bridge identified by the device's bridge choice in the bridge choice table 210 is invoked, and in a step 252 the invoked engine handles the packet routing in accordance with its parameters. Depending on the architecture chosen to implement the multilayer bridge, handling of the packet in the bridge may vary. For example, in one embodiment the engine is invoked and the received packet handled by a controller or other processing engine following instructions based on the invoked engine. In other words, in one embodiment, the bridge engine is a set of software instructions invoked by the bridge processor to handle the packet. In another embodiment, the layer engine can itself include processing capabilities and the packet is routed to the appropriate engine for handling. As these examples illustrate, to one of ordinary skill in the art, other architectures and configurations are permissible as well.

Figure 6:
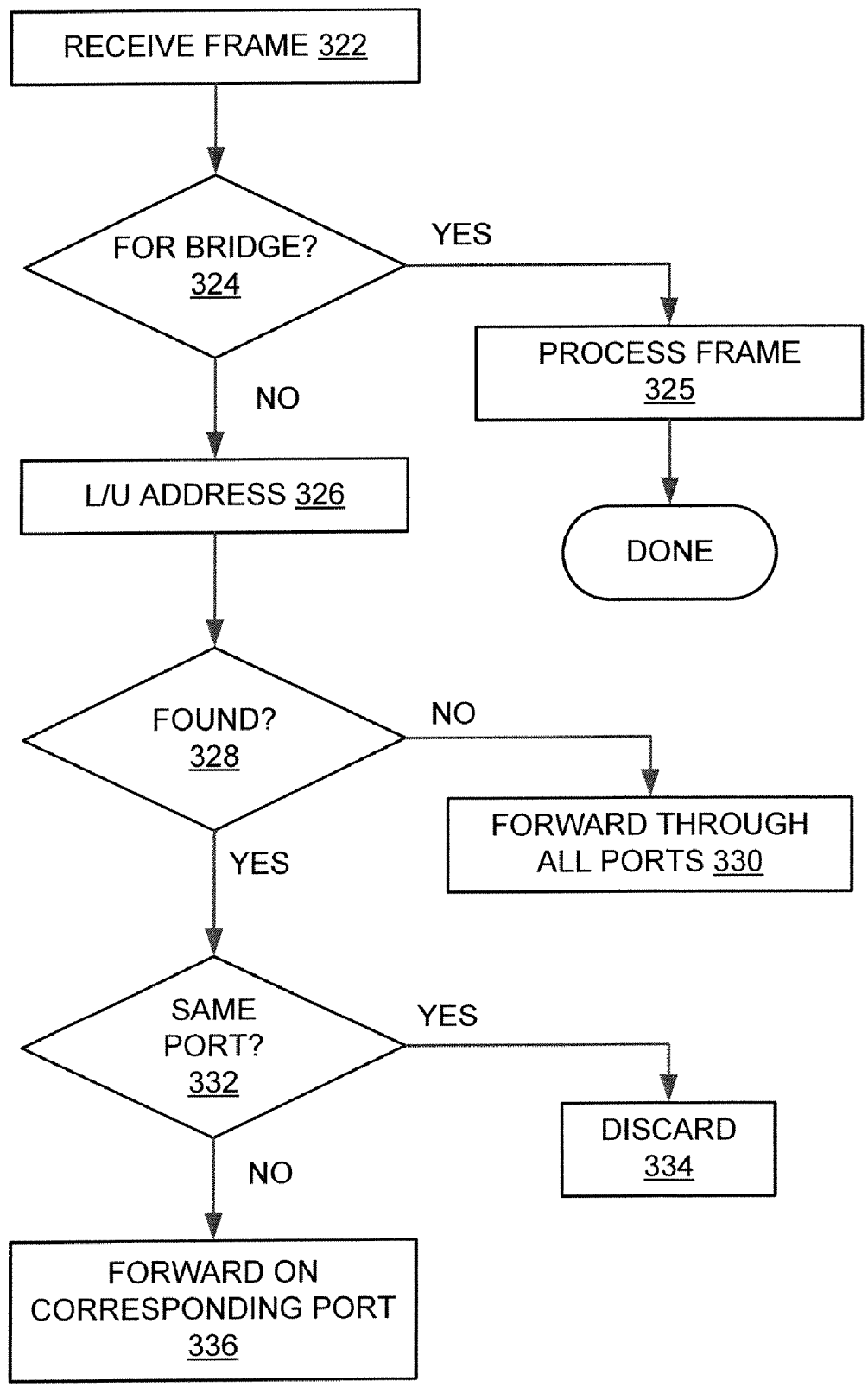
FIG. 6 is an operational flow diagram illustrating an example process applied when a layer 2 bridge engine is invoked.

As stated above, in one embodiment, multilayer bridge 200 is configured to provide layer 2 and layer 3 bridge functionality to the network devices. FIG. 6 is an operational flow diagram illustrating an example process applied when a layer 2 bridge engine is invoked. Referring now to FIG. 6, in a step 322, the layer 2 bridge engine 206 receives a frame of data 322. The layer 2 bridge places the network adaptors of the bridge in a promiscuous mode. In promiscuous mode, the network adapter processes all frames received rather than processing only specific frames. The layer 2 bridge also checks the destination address of the incoming frames, which, in one embodiment, is accomplished by checking the MAC address associated with the packet.

If the destination address (e.g., MAC address) is assigned to the bridge computer, in a step 325 the bridge computer processes the frame. If, on the other hand, in a step 324 it is determined that the MAC address is not assigned to the bridge, the layer 2 bridge looks up the appropriate port on the layer 2 bridge table, identifying the network adaptor and its corresponding LAN segment. In one embodiment, an entry in the layer 2 bridge table comprises a MAC address, port number corresponding to the LAN segment on which a frame from the MAC address was received, and a time-out value. When a valid frame not destined for the bridge is received, the bridge computer looks up the destination MAC address in the layer 2 bridge table in a step 326. If the destination address is found and is on the same port from which the frame was received the frame is silently discarded. This is illustrated by steps 328, 332 and 334.

If, on the other hand, the destination address is found but is on a different port from which the frame was received, the frame is forwarded out through the corresponding port to the destination's LAN segment. This is illustrated by steps 328, 332 and 336. The transparent bridge can intelligently forward inter-segment frames with a known destination MAC address. If, the destination address is not found in step 328, the frame is forwarded out through all of the ports except the one on which the frame was received as illustrated by step 330. This operation can be referred to as flooding. To maintain LAN segment connection transparency, the bridge can blindly forward frames with an unknown destination MAC address. With conventional layer 2 bridging, all broadcast and multicast MAC traffic is flooded because there are never any broadcast or multicast entries in the layer 2 bridge table. Although, other embodiments can be provided wherein broadcast or multicast entries are provided in the bridge table.

As a result of the bridge, network devices on separate LAN segments can communicate with one another and broadcast and multicast traffic can be handled. As such, a level 2 bridge can be used to transparently connect multiple LAN segments and make it appear logically as the same LAN segment. It should be noted that where multiple bridges are configured to form a loop, flooding operations can be problematic. For example, a scenario can arise where a frame with an unknown destination address is multicast endlessly among looped bridges. As such, the IEEE 802.1d standard provides a spanning tree algorithm to identify which network adaptors on bridges can forward frames. As a result, bridges can automatically configure themselves to avoid looped configurations.

Figure 7:
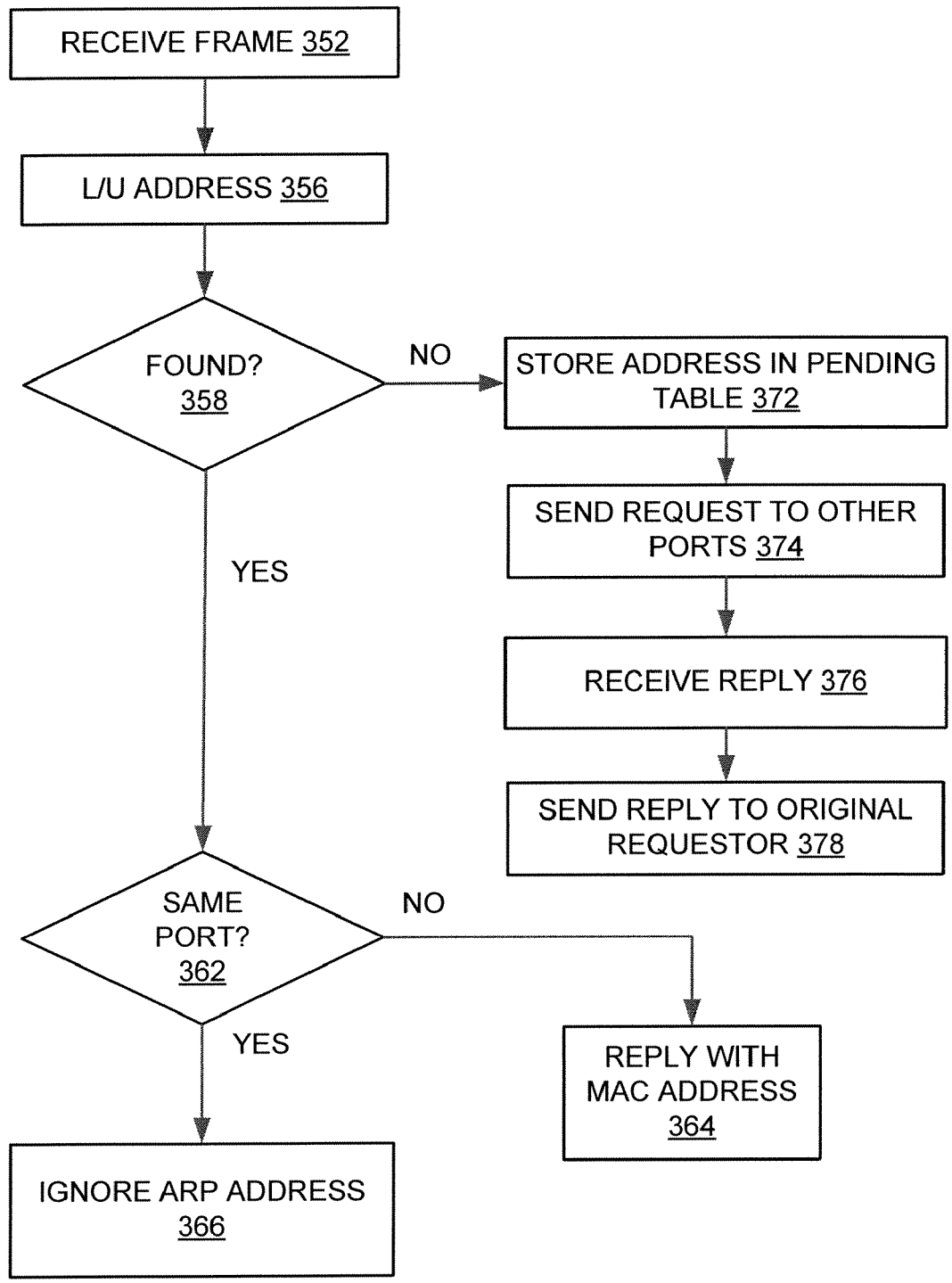
FIG. 7 is an operational flow diagram illustrating an example process performed by a layer 3 bridge in accordance with one embodiment of the invention.

FIG. 7 is an operational flow diagram illustrating an example process performed by a layer 3 bridge in accordance with one embodiment of the invention. Layer 3 bridging can be implemented in such a way that hosts on different LAN segments can be transparently connected through the bridge. Layer 3 bridging can differ from layer 2 bridging because the frame can be changed by the layer 3 bridge before it is forwarded. A layer 3 bridge can include a forwarding table rather than a routing table to perform the forwarding decision. Entries in the forwarding table can include a node IP address, a node MAC address, and a port (the network adaptor on which the node is located). Layer 3 bridging can be implemented based on the address resolution protocol that is used by TCP/IP nodes to resolve the MAC address that corresponds to the next-hop address of an outbound IP packet. As such, a layer 3 bridge can act as an address resolution protocol proxy, it can answer requests from a node on one LAN segment on behalf of a node on another LAN segment, and transfer packets between nodes on different LAN segments.

Referring still to FIG. 7, in a step 352 a frame designating layer 3 bridging is received. In a step 356, the layer 3 bridge looks up the address of the packet. For example, this can be the target IP address of the address resolution protocol request. This can be found on a layer 3 forwarding table. If the address is found to be on a different port, the layer 3 bridge responds to the request with a reply that contains its own MAC address for the port on which the request was received. This is illustrated by steps 358, 362 and 364.

If, on the other hand, an entry for the target IP address of the request is found in the layer 3 forwarding table and it is on the same port, the sending and destination nodes are on the same LAN segment and the address resolution protocol address can be ignored. This is illustrated by steps 358, 362 and 366.

If the bridge requests a target IP address that is not found in the forwarding table in step 328, the operation proceeds at step 372 where the bridge stores the contents of the request in a pending table. In a step 374, the bridge sends its own address resolution protocol request message to all ports except the port on which the original address resolution protocol request was received. When a reply to the bridge's request is received it is matched to the entry in the pending table a unicast address resolution protocol reply can be sent to the original requester. This is illustrated by steps 376 and 378.

Figure 8:
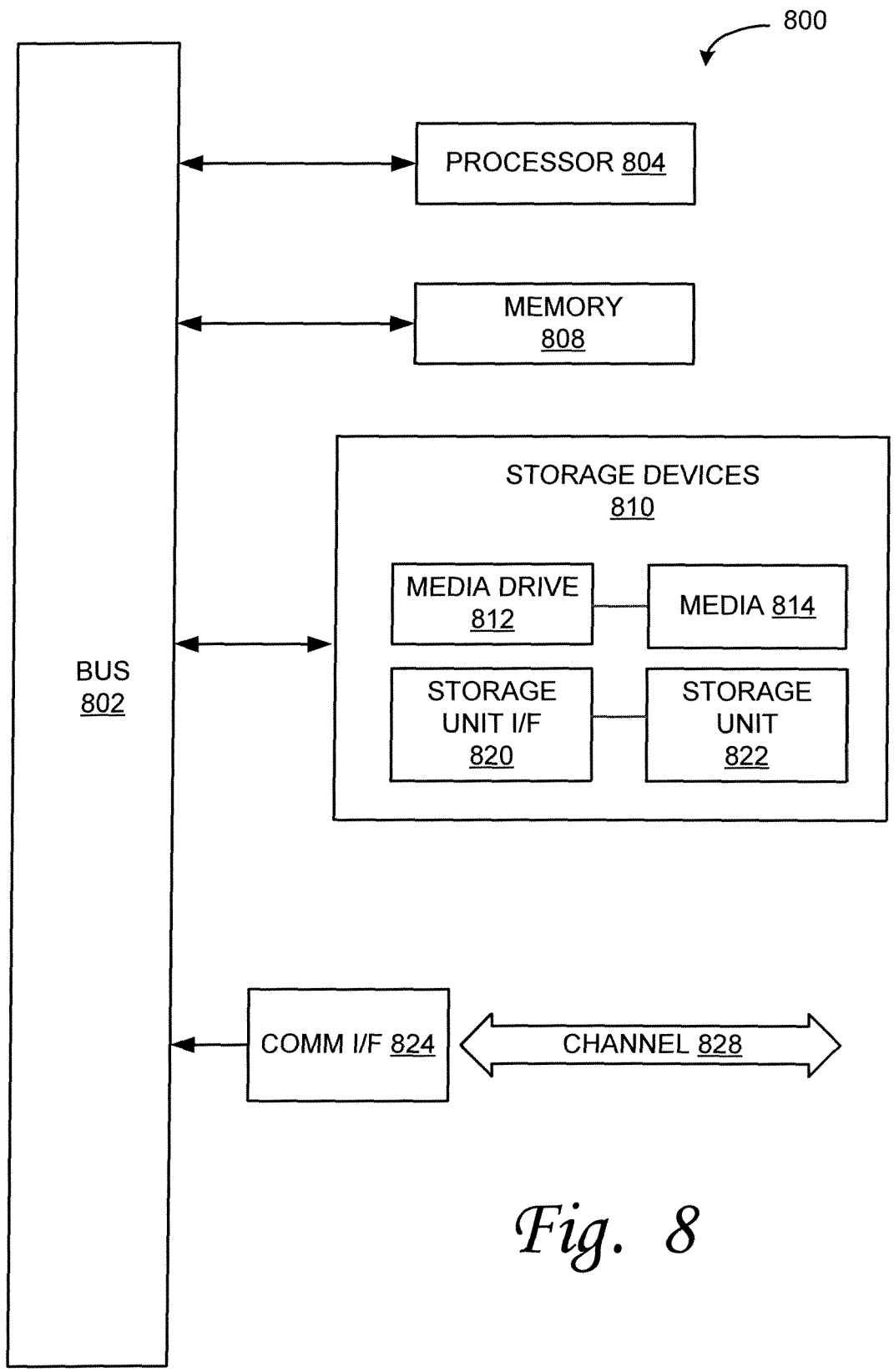
FIG. 8 is a diagram illustrating an example computing system capable of carrying out some or all of the described functionality of the invention.

As used herein, the term "engine" is used to describe a given unit of functionality that can be performed in accordance with one or more embodiments of the present invention. As used herein, an engine can be implemented utilizing any form of hardware, software, or a combination thereof. In implementation, the various engines described herein can be implemented as discrete modules or the functions and features described can be shared in part or in total among one or more engines. In other words, as would be apparent to one of ordinary skill in the art after reading this description, the various features and functionality described herein as associated with a given module can be implemented in one or more separate or shared modules in various combinations and permutations.

Where components, engines or modules of the invention are implemented in whole or in part using software, in one embodiment, these software elements can be implemented to operate with a computing system capable of carrying out the functionality described with respect thereto. One such example computing system is shown in FIG. 8. Various embodiments are described in terms of this example computing system 800. After reading this description, it will become apparent to a person skilled in the relevant art how to implement the invention using other computing systems or architectures.

Referring now to FIG. 8, computing system 800 may represent, for example, desktop, laptop and notebook computers; hand-held computing devices (PDA's, smart phones, cell phones, palmtops, etc.); mainframes, supercomputers, workstations or servers; or any other type of special or general purpose computing devices as may be desirable or appropriate for a given application or environment. Computing system 800 can also represent computing capabilities embedded within or otherwise available to a given device. Computing system 800 can include one or more processors, such as a processor 804. Processor 804 can be implemented using a general-purpose or special-purpose processing engine such as, for example, a microprocessor, controller, or other control logic. In the example illustrated in FIG. 18, processor 804 is connected to a bus 802 or other communication medium to facilitate interaction with other components of computing system 800.

Computing system 800 can also include a main memory 808, preferably random access memory (RAM) or other dynamic memory, for storing information and instructions to be executed by processor 804. Main memory 808 also may be used for storing temporary variables or other intermediate information during execution of instructions to be executed by processor 804. Computing system 800 can likewise includes a read only memory ("ROM") or other static storage device coupled to bus 802 for storing static information and instructions for processor 804.

The computing system 800 can also include information storage mechanism 810, which can include, for example, a media drive 812 and a storage unit interface 820. The media drive 812 can include a drive or other mechanism to support fixed or removable storage media. For example, a hard disk drive a floppy disk drive, a magnetic tape drive, an optical disk drive, a CD or DVD drive (R or RW), or other removable or fixed media drive. Storage media 814, can include, for example, a hard disk, a floppy disk, magnetic tape, optical disk, a CD or DVD, or other fixed or removable medium that is read by and written to by media drive 814. As these examples illustrate, the storage media 814 can include a computer usable storage medium having stored therein particular computer software or data.

In alternative embodiments, information storage mechanism 810 may include other similar instrumentalities for allowing computer programs or other instructions or data to be loaded into computing system 800. Such instrumentalities can include, for example, a fixed or removable storage unit 822 and an interface 820. Examples of such can include a program cartridge and cartridge interface, a removable memory (for example, a flash memory or other removable memory module) and memory slot, a PCMCIA slot and card, and other fixed or removable storage units 822 and interfaces 820 that allow software and data to be transferred from the storage unit 822 to computing system 800.

Computing system 800 can also include a communications interface 824. Communications interface 824 can be used to allow software and data to be transferred between computing system 800 and external devices. Examples of communications interface 824 can include a modem or softmodem, a network interface (such as an Ethernet, network interface card, or other interface), a communications port (such as for example, a USB port, IR port, RS232 port or other port), or other communications interface. Software and data transferred via communications interface 824 are carried on signals, which can be electronic, electromagnetic, optical or other signals capable of being received by a given communications interface 824. These signals can be provided to communications interface 824 via a channel 828. This channel 828 can carry signals and can be implemented using a wired or wireless medium. Some examples of a channel can include a phone line, a cellular phone link, an RF link, an optical link, a network interface, a local or wide area network, and other communications channels.

In this document, the terms "computer program medium" and "computer usable medium" are used to generally refer to media such as, for example, memory 808, storage unit 820, media 814, and signals on channel 828. These and other various forms of computer usable media may be involved in carrying one or more sequences of one or more instructions to processor 804 for execution. Such instructions, generally referred to as "computer program code" (which may be grouped in the form of computer programs or other groupings), when executed, enable the computing system 800 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method for bridging segments of a wireless network, comprising the steps of:
   receiving at a multilayer bridge a first bridge engine choice identification from a first network device during a beacon period of a communication superframe;
   receiving at the multilayer bridge a second bridge engine choice identification from a second network device during the beacon period of the communication superframe;
   receiving at the multilayer bridge a first data packet from the first network device;
   receiving at the multilayer bridge a second data packet from the second network device;
   determining at the multilayer bridge which of a plurality of bridge engines to use for the first network device using the first bridge engine choice identification;
   determining at the multilayer bridge which of the plurality of bridge engines to use for the second network device using the second bridge engine choice identification;
   the multilayer bridge invoking the first determined bridge engine to process the first data packet; and
   the multilayer bridge invoking the second determined bridge engine to process the second data packet.

2. The method of claim 1, further comprising the step of routing the first data packet to a network element using the first invoked bridge choice.

3. The method of claim 1, wherein the step of determining comprises the step of looking up a predetermined bridge choice for the first network device in a data storage device.

4. The method of claim 3, wherein the data storage device comprises a bridge choice lookup table.

5. The method of claim 1, further comprising storing the first bridge engine choice identification in a data storage device.

6. The method of claim 1, wherein the first bridge choice identification from the first network device is received in a data packet.

7. The method of claim 1, wherein the plurality of bridge choices comprise a layer 2 bridge engine and a layer 3 bridge engine.

8. The method of claim 1, wherein the step of invoking the determined bridge engine comprises the step of forwarding the first data packet to the first determined bridge engine for processing.

9. The method of claim 1, wherein the step of invoking the first determined bridge engine comprises the step of executing bridge engine instructions to process the data packet.

10. The method of claim 1, wherein the step of processing the first data packet comprises forwarding the first data packet to all ports or forwarding the first data packet to a corresponding port.

11. The method of claim 1, further comprising invoking a default bridge engine to process the first data packet if the first assigned bridge engine is not available.

12. A wireless multilayer bridge, comprising:
a first bridge engine and a second bridge engine;
a controller communicatively coupled to the first and second bridge engines; and
a data storage device communicatively coupled to the controller and configured to store a bridge choice preference for a network device;
wherein the controller is configured to receive a first bridge engine choice identification from a first network device during a beacon period of a communication superframe and a second bridge engine choice identification from a second network device during the beacon period of the communication superframe; a communication from a device, retrieve first bridge engine choice for the first network device in the data store, retrieve the second bridge engine choice for the second network device in the data store; invoke the first bridge engine identified for the first network device; and invoke the second bridge engine identified for the second network device.

13. The wireless multilayer bridge of claim 12, further comprising a wireless communications interface configured to interface the wireless multilayer bridge to other network devices.

14. The wireless multilayer bridge of claim 12, wherein the data store comprises a bridge choice table.

15. The wireless multilayer bridge of claim 12, wherein the first bridge engine comprises a layer 2 bridge engine and the second bridge engine comprises a layer 3 bridge engine.

16. A computer program product comprising a non-transitory computer readable storage media having stored computer program logic for enabling a controller in a wireless multilayer bridge to process data packets, said computer program logic comprising:
first computer readable program code for enabling the controller to receive a first bridge engine choice identification from a first network device during a beacon period of a communication superframe;
second computer readable program code for enabling the controller to receive a second bridge engine choice identification from a second network device during the beacon period of the communication superframe;
third computer readable program code for enabling the controller to receive a first data packet from the first network device;
fourth computer readable program code for enabling the controller to receive a second data packet from the second network device;
fifth computer readable program code for enabling the controller to determine at the multilayer bridge which of a plurality of bridge engines to use for the first network device;
sixth computer readable program code for enabling the controller to determine at the multilayer bridge which of the plurality of bridge engines to use for the second network device;
seventh computer readable program code for enabling the controller to invoke the first determined bridge engine to process the first data packet; and
eighth computer readable program code for enabling the controller to invoke the second determined bridge engine to process the second data packet.

17. The computer program product of claim 16, further comprising computer readable program code for enabling the controller to route the first data packet to a network element using the first invoked bridge choice.

18. The computer program product of claim 16, wherein fifth computer readable program code comprises computer readable program code for enabling the controller to look up a predetermined bridge choice for the network device in a data storage device.

19. The computer program product of claim 18, wherein the data storage device comprises a bridge choice lookup table.

20. The computer program product of claim 16, further comprising computer readable program code for enabling the controller to store the first bridge engine choice identification in a data storage device.

21. The computer program product of claim 16, wherein first computer readable program code comprises computer readable program code for receiving the bridge engine choice identification from the first network device in a data packet.

22. The computer program product of claim 16, wherein the plurality of bridge choices comprise a layer 2 bridge engine and a layer 3 bridge engine.

23. The computer program product of claim 16, wherein the seventh computer readable program code comprises computer readable program code for enabling the controller to forward the data packet to the determined bridge engine for processing.

24. The computer program product of claim 16, wherein the seventh computer readable program code comprises computer readable program code for enabling the controller to execute bridge engine instructions to process the data packet.

25. The computer program product of claim 16, wherein the processing the first data packet comprises forwarding the first data packet to all ports or forwarding the first data packet to a corresponding port.

26. The computer program product of claim 16, further comprising computer readable program code for invoking a default bridge engine to process the first data packet if the first assigned bridge engine is not available.

27. A wireless multilayer bridge, comprising:
means for receiving at a multilayer bridge a first bridge engine choice identification from a first network device during a beacon period of a communication superframe;

means for receiving at the multilayer bridge a second bridge engine choice identification from a second network device during the beacon period of the communication superframe;

means for receiving at the multilayer bridge a first data packet from the first network device;

means for receiving at the multilayer bridge a second data packet from the second network device;

means for determining at the first multilayer bridge which of a plurality of bridge engines to use for the network device;

means for determining at the multilayer bridge which of the plurality of bridge engines to use for the second network device using the second bridge engine choice identification means for invoking the first determined bridge engine to route the first data packet; and means for invoking the second determined bridge engine to process the second data packet.

28. The wireless multilayer bridge of claim 27, further comprising means for routing the data packet to a network element using the first invoked bridge choice.

29. The wireless multilayer bridge of claim 27, wherein the means for determining comprises means for looking up a predetermined bridge choice for the first network device in a data storage device.

30. The wireless multilayer bridge of claim 29, wherein the data storage device comprises a bridge choice lookup table.

31. The wireless multilayer bridge of claim 27, wherein the means for receiving the first bridge engine choice identification comprises means for receiving the first bridge engine choice identification from the first network device in a data packet.

32. The wireless multilayer bridge of claim 27, wherein the plurality of bridge choices comprise a layer 2 bridge engine and a layer 3 bridge engine.

33. The wireless multilayer bridge of claim 27, further comprising means for invoking a default bridge engine to process the first data packet if the first assigned bridge engine is not available.

* * * * *